(12) United States Patent
Shea et al.

(10) Patent No.: US 8,631,460 B2
(45) Date of Patent: Jan. 14, 2014

(54) SYSTEMS AND METHODS FOR IMPLEMENTING TRANSPARENT ENCRYPTION

(75) Inventors: Woody Shea, Round Rock, TX (US); Michael Fleck, Virginia Beach, VA (US)

(73) Assignee: Cipherpoint Software, Inc., Round Rock, TX (US)

( * ) Notice: Subject to any disclaimer, the term of this patent is extended or adjusted under 35 U.S.C. 154(b) by 0 days.

(21) Appl. No.: 13/426,429

(22) Filed: Mar. 21, 2012

(65) Prior Publication Data

US 2012/0246463 A1  Sep. 27, 2012

Related U.S. Application Data

(60) Provisional application No. 61/466,706, filed on Mar. 23, 2011.

(51) Int. Cl.
*H04L 29/06* (2006.01)

(52) U.S. Cl.
USPC ............................................. 726/1; 713/153

(58) Field of Classification Search
USPC ............................................. 726/1; 713/153
See application file for complete search history.

(56) References Cited

U.S. PATENT DOCUMENTS

| | | | | |
|---|---|---|---|---|
| 4,123,747 A | * | 10/1978 | Lancto et al. | 713/185 |
| 4,578,530 A | * | 3/1986 | Zeidler | 705/71 |
| 5,109,413 A | * | 4/1992 | Comerford et al. | 705/54 |
| 5,222,137 A | * | 6/1993 | Barrett et al. | 380/271 |
| 5,751,813 A | * | 5/1998 | Dorenbos | 713/153 |
| 5,784,461 A | * | 7/1998 | Shaffer et al. | 705/51 |
| 6,700,964 B2 | * | 3/2004 | Schmid et al. | 379/189 |
| 7,333,616 B1 | * | 2/2008 | Brettle et al. | 380/277 |
| 7,660,959 B2 | | 2/2010 | Asher et al. | |
| 7,743,403 B2 | * | 6/2010 | McCarty | 726/1 |
| 7,743,420 B2 | | 6/2010 | Shulman et al. | |
| 7,752,455 B2 | | 7/2010 | Maheshwari et al. | |
| 7,796,760 B2 | * | 9/2010 | Brettle et al. | 380/277 |
| 7,900,239 B2 | * | 3/2011 | Van Someren | 726/1 |
| 7,934,247 B2 | * | 4/2011 | Greco et al. | 726/1 |
| 7,945,519 B2 | | 5/2011 | Malcolm | |
| 7,995,758 B1 | * | 8/2011 | Shapiro | 380/259 |
| 8,370,648 B1 | * | 2/2013 | Natanzon | 713/193 |
| 2004/0125402 A1 | * | 7/2004 | Kanai et al. | 358/1.15 |
| 2004/0230792 A1 | * | 11/2004 | McCarty | 713/153 |
| 2004/0250082 A1 | * | 12/2004 | Li et al. | 713/181 |
| 2005/0005112 A1 | * | 1/2005 | Someren | 713/167 |
| 2006/0005017 A1 | * | 1/2006 | Black et al. | 713/165 |
| 2006/0075228 A1 | * | 4/2006 | Black et al. | 713/167 |
| 2008/0066144 A1 | * | 3/2008 | Greco et al. | 726/1 |

(Continued)

*Primary Examiner* — David García Cervetti
(74) *Attorney, Agent, or Firm* — Kilpatrick Townsend & Stockton LLP

(57) ABSTRACT

A method of providing transparent encryption for a web resource includes a key manager receiving an encryption key policy; receiving user identifiers and resource locators; defining an access control list based the user identifiers; generating an encryption key and a key identifier for a first resource locator; and establishing a secure communication channel between first and second watchdog modules. The method also includes the watchdog sending encryption information using the secure communication channel. The method also includes a transparent encryption module storing the encryption key and the access control list in protected memory; receiving an input comprising a request to access the first resource stored in the web resource; determining that the user identifier is included in the access control list; encrypting data using the encryption key; and decrypting data using the encryption key.

24 Claims, 10 Drawing Sheets

(56) References Cited

U.S. PATENT DOCUMENTS

| | | | |
|---|---|---|---|
| 2008/0080715 A1* | 4/2008 | Lee et al. | 380/277 |
| 2008/0212782 A1* | 9/2008 | Brettle et al. | 380/277 |
| 2008/0235759 A1* | 9/2008 | McCarty | 726/1 |
| 2009/0028336 A1* | 1/2009 | Goodman et al. | 380/277 |
| 2009/0028339 A1* | 1/2009 | Goodman et al. | 380/278 |
| 2009/0092252 A1* | 4/2009 | Noll et al. | 380/277 |
| 2009/0119743 A1 | 5/2009 | Werner et al. | |
| 2009/0185223 A1* | 7/2009 | Kanai et al. | 358/1.15 |
| 2009/0235303 A1* | 9/2009 | Yamaoka et al. | 725/31 |
| 2010/0146582 A1* | 6/2010 | Jaber et al. | 726/1 |
| 2010/0158253 A1* | 6/2010 | Challener | 380/278 |
| 2010/0199088 A1* | 8/2010 | Nath et al. | 713/167 |
| 2010/0235649 A1* | 9/2010 | Jeffries et al. | 713/189 |
| 2011/0093721 A1* | 4/2011 | Perlman | 713/189 |
| 2011/0145560 A1* | 6/2011 | Moon et al. | 713/150 |
| 2011/0167102 A1 | 7/2011 | Matzkel et al. | |
| 2011/0173438 A1 | 7/2011 | Matzkel | |
| 2011/0178933 A1* | 7/2011 | Bailey, Jr. | 705/71 |
| 2011/0314088 A1 | 12/2011 | Matzkel et al. | |
| 2012/0036370 A1* | 2/2012 | Lim et al. | 713/189 |
| 2012/0079266 A1* | 3/2012 | Ogata et al. | 713/150 |
| 2012/0131354 A1* | 5/2012 | French | 713/189 |
| 2012/0166793 A1* | 6/2012 | Kim | 713/150 |
| 2012/0204032 A1* | 8/2012 | Wilkins et al. | 713/170 |
| 2012/0239944 A1* | 9/2012 | Goodman et al. | 713/193 |
| 2012/0314854 A1* | 12/2012 | Waters | 380/28 |
| 2012/0323717 A1* | 12/2012 | Kirsch | 705/26.1 |
| 2012/0324242 A1* | 12/2012 | Kirsch | 713/189 |
| 2012/0331284 A1* | 12/2012 | Kouladjie et al. | 713/153 |
| 2013/0067012 A1 | 3/2013 | Matzkel et al. | |
| 2013/0067217 A1 | 3/2013 | Matzkel et al. | |

* cited by examiner

SYSTEMS AND METHODS FOR IMPLEMENTING TRANSPARENT ENCRYPTION

CROSS-REFERENCES TO RELATED APPLICATIONS

This application is a nonprovisional of, and claims the benefit to U.S. Provisional Patent Application No. 61/466,706, filed on Mar. 23, 2011, the entire contents of which are incorporated herein.

BACKGROUND

Web resources are commonly used by groups of people needing concurrent access to documents, files, and data. These web resources often involve content management and document management systems. One of the most popular content management systems is Microsoft SharePoint®. Content management systems such as SharePoint® allow for management and provisioning of intranet portals, extranets, websites, document and file management, collaboration spaces, social tools, enterprise search, business intelligence, process integration, system integration, workflow automation, and core infrastructure for business solutions.

Web resources may be organized into groups, or farms, that are managed centrally by a farm administrator. Administrators typically have all of the access rights and privileges associated with their group or farm. Administrators may typically set permissions for farms or files that may control access to a client device depending on the client device's designation as a reader, contributor, or owner of the content. Many types of content may be stored in individual farms such as pictures, text documents, presentations, databases, and/or the like. The content within a farm resides in an unencrypted format.

BRIEF SUMMARY

Embodiments of present invention relate generally to encryption systems. More specifically, these embodiments relate to methods and systems for encrypting data in a web resource. Merely by way of example, the invention has been applied to a method of implementing and operating a transparent encryption system for a web resource such as Microsoft SharePoint®. The methods and techniques can be applied to a variety of web resources and information systems.

According to one embodiment, a method of providing transparent encryption for a web resource may include one or more of the following: receiving, at a key manager operating on a first server, an encryption key policy; receiving, at the key manager, from the web resource, one or more user identifiers and one or more resource locators, wherein the web resource may comprise a file store accessible to a plurality of users and may be operated by a resource administrator; defining, at the key manager, an access control list based on a selection of user identifiers; associating, at the key manager, the access control list and the encryption key policy with a first resource locator from the one or more resource locators; generating, at the key manager, an encryption key and a key identifier for the first resource locator; establishing, by a first watchdog module operating on the first server, a secure communication channel between the first watchdog module and a second watchdog module operating on a second server; sending, from the first watchdog module, to the second watchdog module, encryption information using the secure communication channel, wherein the encryption information may comprise: the encryption key, the key identifier, and the access control list; storing, at the transparent encryption module on the second server, the encryption key and the access control list in protected memory; receiving, at the transparent encryption module, from a client device, an input comprising a request to access a first resource stored in the web resource and a user identifier; determining, at the transparent encryption module, that the user identifier is included in the access control list for the first resource; determining, at the transparent encryption module, that accessing the first resource does not violate the encryption key policy for the user identifier; encrypting, at the transparent encryption module, data using the encryption key that is passed from the client device to the first resource; and decrypting, at the transparent encryption module, data using the encryption key that is passed from the first resource to the client device.

Additionally, the web resource may comprise MICROSOFT SHAREPOINT. The first server may be physically secured from the second server. The resource administrator may be denied access to the first server. The resource administrator may be denied access to the protected memory on the second server. The method may also include encrypting, by the key manager on the first server, the encryption key using a master encryption key, wherein the master encryption key requires two security administrator passwords to access; and storing, by the key manager, the encrypted encryption key on a hard drive on the first server. The method may additionally include determining, at the transparent encryption module, that a time of day of the input does not violate a time of day restriction; determining, at the transparent encryption module, that a data amount associated with the user identifier does not violate a data threshold; and determining, at the transparent encryption module, that the encryption key is not expired according to a key expiration date; wherein the access control list may comprise the time of day restriction, the data threshold, and the key expiration date. The method may further include monitoring, by the first watchdog module, the key manager to detect attempts to change a configuration of the key manager; and monitoring, by the second watchdog module, the transparent encryption module to determine whether any software is operating between the transparent encryption module and the web resource; and logging, on the first server, by the first watchdog module, events involving the transparent encryption module on the second server.

According to another embodiment, a method of providing transparent encryption for a web resource may include receiving, at a second server, from a key manager operating on a first server, information that may comprise: an encryption key; a key identifier; an access control list; and one or more resource locators; receiving one or more resources from the web resource, wherein each resource may correspond to one of the one or more resource locators; encrypting each of the one or more resources using the encryption key to create one or more encrypted resources; appending the key identifier to each of the one or more encrypted resources; sending the one or more encrypted resources to the web resource; and storing the encryption key and the access control list in protected memory, while preventing the encryption key and the access control list from being stored on a hard disk, wherein at least a part of the web resource operates on the second server; and wherein the protected memory is not accessible by a web resource administrator of the second server.

The method may also include receiving a request from a client device, wherein the request may comprise a resource identifier; and a user identifier; determining that the user identifier is authorized to access the resource identifier according to the access control list; receiving an encrypted resource from the web resource that corresponds to the resource identifier; determining that the key identifier appended to the encrypted resource corresponds to the encryption key; decrypting the encrypted resource using the encryption key to create a decrypted resource; and sending the decrypted resource to the client device. The method may additionally include determining that a time of day of the request does not violate a time-of-day restriction according to the access control list; determining that a data amount associated with the request does not violate a data quota according to the access control list; and determining that the encryption key is not deactivated. The method may further include determining that a first resource in the web resource comprises a form with structured data; creating an encrypted form with the encryption key; replacing data in the form with placeholders that reference corresponding encrypted data in the encrypted form; and storing the form in the web resource with the encrypted form as an attachment. The web resource may be MICROSOFT SHAREPOINT. The method may also include receiving a request from a client device, wherein the request comprises accessing a resource identifier; determining that the resource identifier is included in the access control list; determining that a resource associated with the resource identifier is not encrypted in the web resource; and sending a message to the key manager operating on the first server indicating that the resource is not encrypted. The method may additionally include receiving a request from a client device, wherein the request comprises accessing a resource identifier; receiving an encrypted resource from the web resource that corresponds to the resource identifier; determining that the encryption key associated with the key identifier appended to the encrypted resource is deactivated; and sending an indication to the client device that the encrypted resource is not accessible. The method may further include receiving a post request from a client device, wherein the post request comprises a resource identifier and an unencrypted resource; determining that the resource identifier is included in the access control list; determining that the encryption key is expired, wherein an expired key cannot be used to encrypt new files; sending an indication to the client device that the unencrypted resource cannot be posted to the web resource. The indication may be a standard SHAREPOINT access denied web page.

According to yet another embodiment, a computer-readable memory is discussed having stored thereon a sequence of instructions which, when executed by one or more processors, causes the one or more processors to manage a security policy for a web resource by a key manager by: receiving an encryption key policy and a key expiration date; receiving a time of day restriction and a data quota; receiving, from the web resource, one or more user identifiers, wherein the web resource operates on a separate server; receiving a selection of user identifiers from the one or more user identifiers; defining an access control list based on the selection of user identifiers, the encryption key policy, the time of day restriction, and the data quota; receiving, from the web resource on the separate server, one or more resource locators; receiving a selection of a first resource locator from the one or more resource locators; associating the access control list and the encryption key policy with the first resource locator; generating an encryption key and a key identifier for the first resource locator; sending the encryption key, the key identifier, and the access control list to a transparent encryption module, wherein the transparent encryption module is communicatively coupled to the web resource; and wherein the transparent encryption module may be located on the separate server; encrypting the encryption key using a master encryption key; and storing the encrypted encryption key on a hard drive of the key manager; wherein the hard drive is physically secured from a web resource administrator of the separate server.

The master encryption key may require two security administrator passwords to access. The instructions may also include receiving an indication from the transparent encryption module that the encryption key is expired according to the encryption key policy; generating a second encryption key and a second key identifier for the first resource locator; and sending the second encryption key and the second key identifier to the transparent encryption module. The instructions may additionally include receiving an indication from the transparent encryption module that the transparent encryption module is missing the encryption key; and resending the encryption key to the transparent encryption module. The data quota may comprise an expected number of downloads within a time period.

According to yet another embodiment, A system for maintaining the integrity of a transparent encryption system for a web resource by a watchdog function, the system comprising: a processor; and a memory communicatively coupled with and readable by the processor and having stored therein a sequence of instructions which, when executed by the processor, cause the processor to maintaining the integrity of the transparent encryption system by: establishing a secure communication channel between a key manager operating on a first server and a transparent encryption module operating on a second server; receiving, from the key manager, information associated with a first resource locator in the web resource, wherein the information comprises: an encryption key; a key identifier; and an access control list; sending the information to the transparent encryption module using the secure communication channel; logging, on the first server, an attempt to access a first resource associated with the first resource locator by the transparent encryption module on the second server; crawling the web resource on the second server to identify unencrypted resources that should be encrypted according to the encryption policy, wherein the watchdog function uses an API of the web resource; monitoring the key manager to detect attempts to change a configuration of the key manager; and monitoring the transparent encryption module to determine whether any software is operating between the transparent encryption module and the web resource.

The instructions may also include detecting a software process operating between the web resource and the transparent encryption module on the second server; and sending information to the key manager indicating the software process. The instructions may additionally include causing the transparent encryption module to prevent further decryption of resources in the web resource. The instructions may further include monitoring the physical security of the first server. The instructions may also include detecting an unencrypted resource that should be encrypted within the web resource; and causing the transparent encryption module to encrypt the unencrypted resource according to an encryption policy.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sublabel, it is intended to refer to all such multiple similar components.

DETAILED DESCRIPTION

Figure 1:
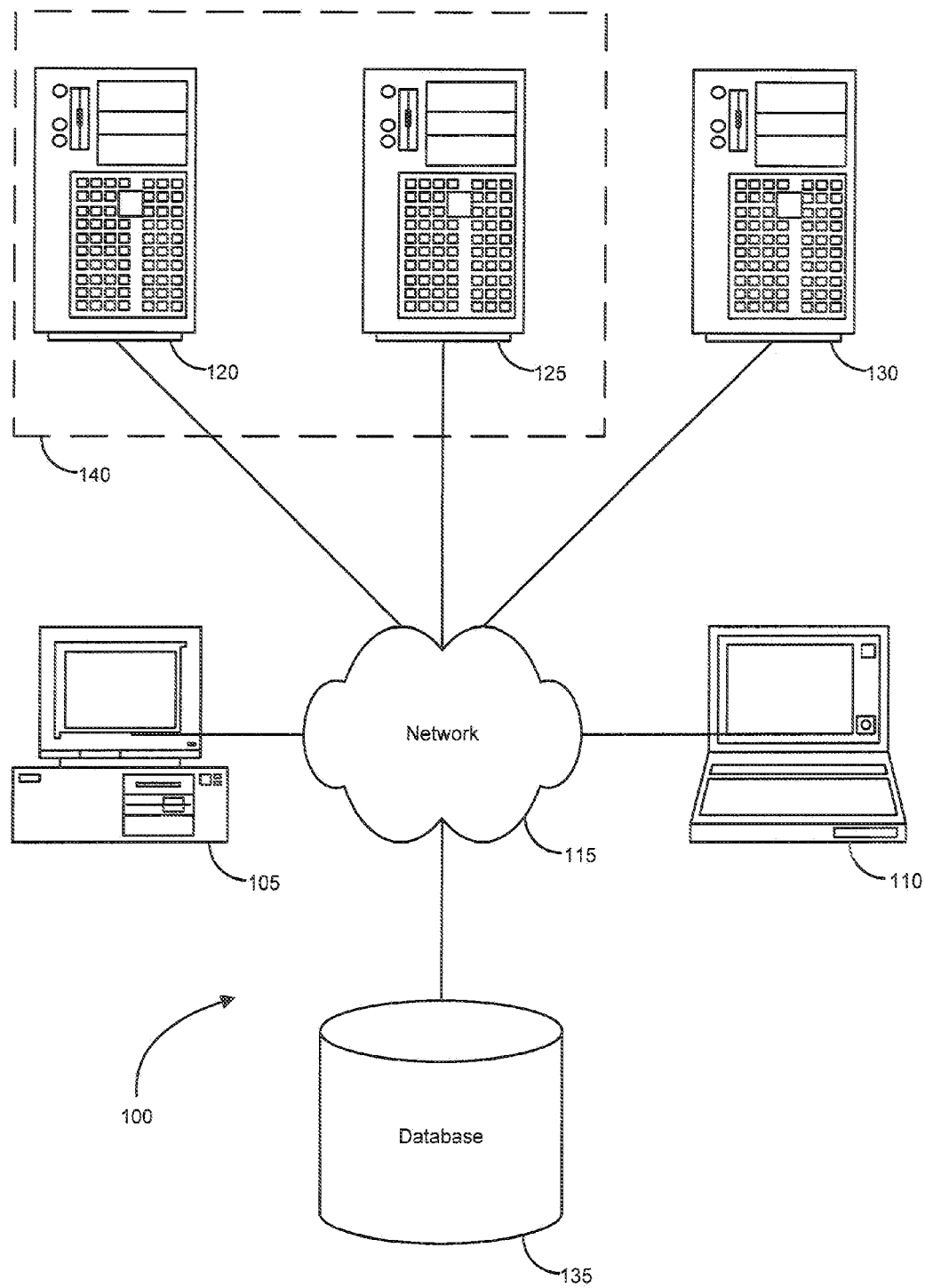
FIG. 1 illustrates a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Described herein, are embodiments for creating encryption policies, access lists, and encryption keys for Web resources. The keys may be generated and managed independently on a key manager server that is physically secure and separate from the resource server. Keys may be transmitted to a transparent encryption module located on the same server as the web resource. The transparent encryption module may store the keys and access lists in protected memory such that access to them is denied to resource administrators. The access control lists may include time of day restrictions and data quotas so as to prevent authorized client devices from inappropriately accessing data. The transparent encryption module may act as a proxy for the web resource, encrypting and decrypting files as they are transmitted to and from client devices. This process may be completely transparent to the client device until it tries to access resources for which he does not have permission. This ensures that data residing within the web resource is encrypted, and protected from insider threats at all times. Additionally, the watchdog module may reside on both the key manager server and the transparent encryption server to establish and maintain secure communication of keys, to log encryption events, to crawl the web resource so as to ensure that all files designated in an access control list are encrypted, and to perform health and security checks on all components of the system.

Existing technology requires the end-user to manage their own keys, or relies on resource administrators to manage the keys. This opens up more opportunities to unauthorized access through loss, theft, and/or accidental exposure of the encryption keys. Embodiments discussed herein need not expose any key material, and automate key management processes, thus providing an extra layer of protection for the keys. Because end-users can, and do, lose or accidentally expose encryption keys when managing them manually, these embodiments automate key management process, making it transparent to the end-user. By never exposing the encryption keys to either users or resource administrators, data within the web resource is protected against privileged insiders. A security administrator is allowed to define rules that restrict access through privileges, as well as both time of day and number of access request constraints. Therefore, these embodiments provide protection against both accidental and intentional exposure of protected data, on both a wholesale level and a granular level.

The keys may be managed and generated by a key manager server. The key manager server may be physically separate from a server on which the transparent encryption module and the web resource operate. In some embodiments, the key manager server may be physically secured within a hardened container for which only security administrators have access. The keys residing on the key manager server may be encrypted by a master encryption key that requires two-person control by security administrators. The keys may be transmitted from the key manager server to the transparent encryption module through a secure communication channel as needed.

The transparent encryption module provides protection for unstructured and structured data for web-based applications without requiring any decision points from the end-user. In other words, the process is entirely transparent to the end-user. Protection may be achieved through encryption of the data as it resides within the web resource. Since the data is encrypted while 'at rest' and the encryption keys are not saved on the same system, embodiments herein protect sensitive information even if the media on which they are stored within the web resource are stolen or lost. By never exposing the encryption keys, even to system-, web-based application-, and database-administrators, these embodiments protect against privileged insiders attempting to gain unauthorized access to data within the web resource.

A watchdog module may be used to maintain and monitor the integrity of the transparent encryption system. First, the watchdog module may facilitate secure, bidirectional communication between the key manager server and the transparent encryption module server. The secure communication channel may be used to transmit encryption keys between the two servers, as well as messages and other encryption information. Second, the watchdog module may periodically examine the status of the transparent encryption module to ensure that has not been disabled or tampered with, and to ensure that no other software has been inserted between either the web resource in the transparent encryption module, or the key manager and the transparent encryption module. In one embodiment, the watchdog module is divided into two software modules, each operating on one of the two servers. Any encryption events or tampering events may be recorded in a log file by the watchdog module, and a message indicating such may be sent to security administrator. Thus, these embodiments not only protect the data within the web resource, they also protect the encryption system itself.

The embodiments disclosed herein may be implemented within one or more computer systems operating alone, in combination with other computer systems in a networked environment. FIG. 1 is a block diagram illustrating components of an exemplary operating environment in which various embodiments of the present invention may be implemented. The system 100 can include one or more user computers 105, 110, which may be used to operate a client, whether a dedicated application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server.

Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
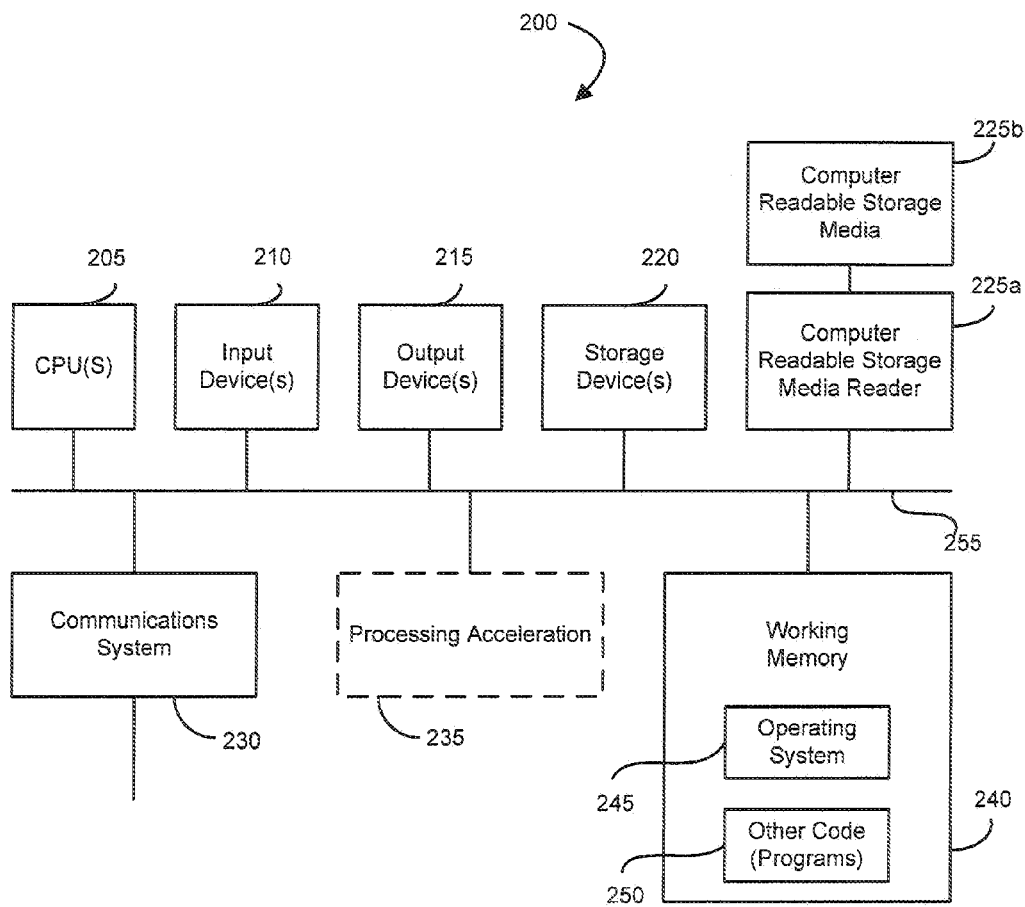
FIG. 2 illustrates a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

The following methods may be implemented by a computer system, such as computer system 200 in FIG. 2. Each step of these methods may be done automatically by the computer system, and/or may be provided as inputs and/or outputs to a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a Web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Therefore, it will be understood in light of this disclosure, that each step and each method described herein may be altered to include an input and output to and from a user, or may be done automatically by a computer system.

Figure 3:
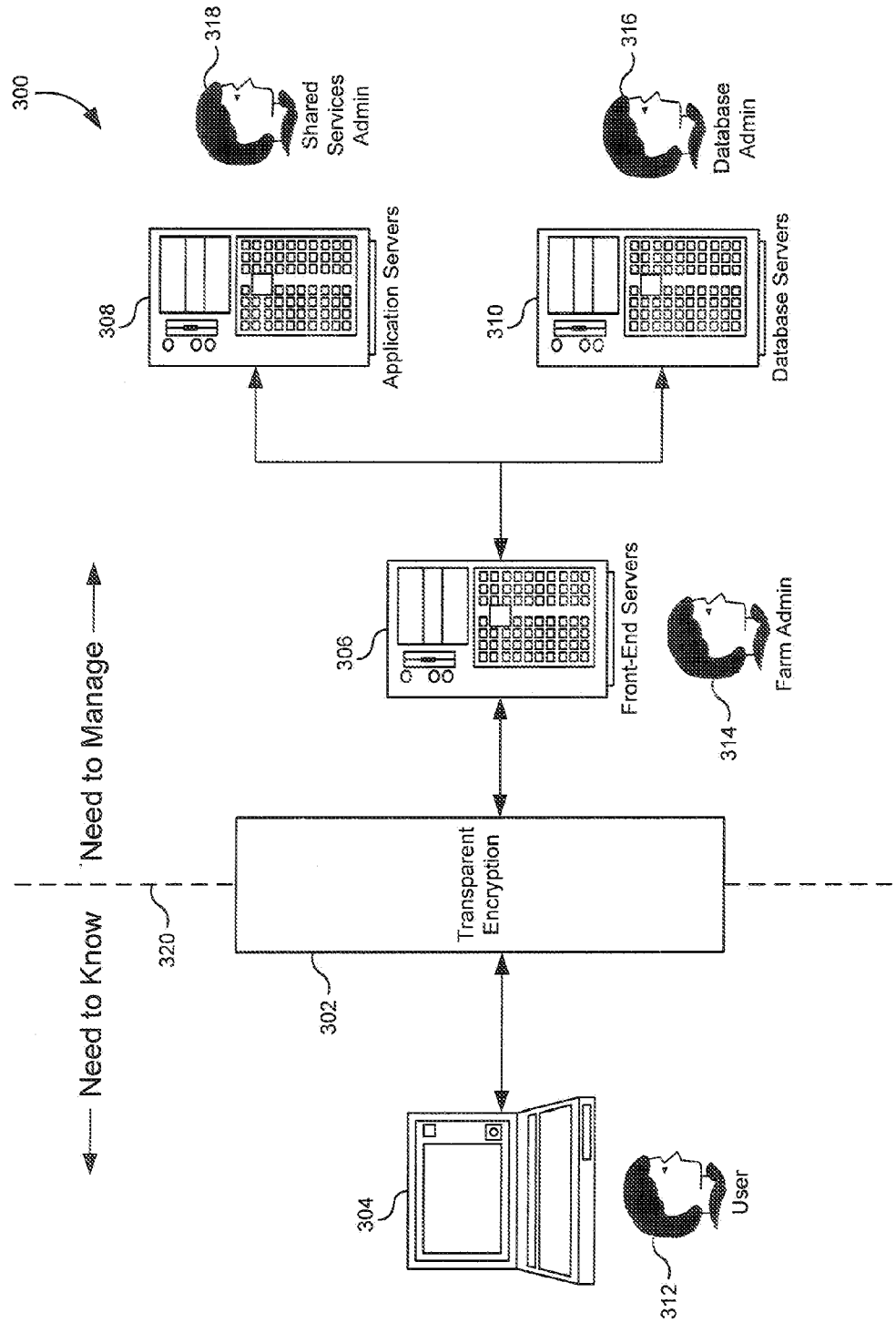
FIG. 3 illustrates a block diagram of a web resource with a transparent encryption system, according to one embodiment.

FIG. 3 illustrates a block diagram 300 of a web resource with a transparent encryption system 302, according to one embodiment. The web resource may be divided into various components, such as one or more application servers 308 and one or more database servers 310. These components may each have their own administrator. For example, the shared services administrator 318 may oversee the one or more application servers 308, and a database administrator 316 may oversee the one or more database servers 310. In a typical configuration, the shared services administrator 318 and the database administrator 316 have access all data stored within the servers.

In a web resource such as Microsoft SharePoint®, the one or more application servers 308 and the one or more database servers 310 may be accessible to the public through one or more front end servers 306. The one more front end servers 306 may be administered by a farm administrator 314. The farm administrator may have access to all data that passes through the one or more front end servers 306. It will be understood in light of this disclosure that many other types and arrangements of servers may be used with any web resource. Although Microsoft SharePoint® is used as an example web resource throughout, many other types of web resources are contemplated by embodiments discussed herein.

The farm administrator 314, the database administrator 316, and the shared services administrator 318 traditionally have access to the data within the web resource because they have a need to manage the operation of the web resource itself. However, access to the data in an unencrypted form is not necessary to ensure that the web resource operates correctly. Therefore, the need to manage does not necessarily imply a need to access the contents stored within the web resource. Line 320 in block diagram 300 represents a division between those with access to the data. Administrators and others to the right of line 320 may have access to the data because of the need to manage, but not in an unencrypted state.

Those to the left of line 320 in block diagram 300 may have access to data within the web resource by virtue of a need to know. In other words, a user 312 may need to access data within the web resource because he/she is a member of a team working collaboratively with the data. For example, a user 312 may need to access schedules, presentations, and documents related to a work project for which the web resource was created in the first place. The user 312 may access the web resource using a client device 304. The client device 304 may comprise a laptop computer, desktop computer, thin client, workstation, tablet computer, smart phone, and/or the like. In contrast to having a need to manage, having a need to know does require access to at least some of the data in the web resource in an unencrypted state. However, simply having a need to know does not eliminate the danger of an inside threat. A single-user may download a large amount of information from the web resource, and then intentionally or unintentionally expose the data to those without a need to know.

In addition to protecting data within the web resource against insider threats having a need to manage or need to know, embodiments herein protect against traditional threats from parties without a need to know or a need to manage. To provide this protection, a transparent encryption system 302 may be installed between the web resource and the client device 304. The transparent encryption system 302 acts as a shim, inserting a communication software stack to intercept files being checked in and out of the web resource. Files may be transparently encrypted as they are uploaded/downloaded based on access control lists and encryption policies. Therefore, by encrypting the files at rest, decrypting them only for authorized client devices according to an access list, and not exposing the encryption keys, the transparent encryption system 302 protects against the insider and outsider threats discussed above.

Figure 4:
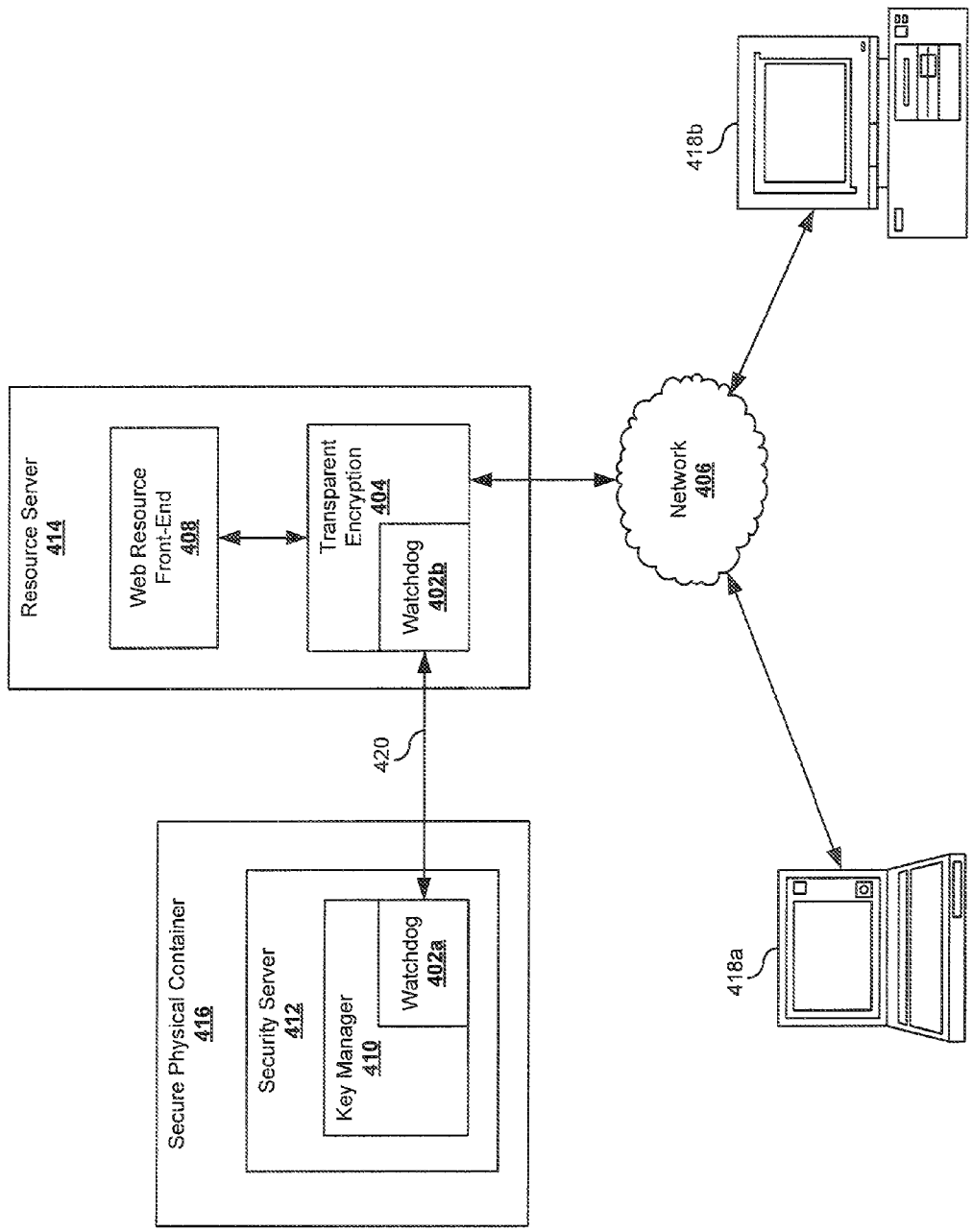
FIG. 4 illustrates a block diagram of a transparent encryption system operating in a two-server configuration, according to one embodiment.

FIG. 4 illustrates a block diagram 400 of a transparent encryption system operating in a two-server configuration, according to one embodiment. The key manager 410 may operate on a security server 412. In one embodiment, the security server is housed in a secure physical container 416. The secure physical container may be a lockbox, cage, locked closet, and/or other secure environment that prevents physical tampering. In one embodiment, the security server may be enclosed within a housing that prevents its ports from being accessed or its hard drives from being removed without a key. The secure physical container 416 may be implemented using the housing of the security server 412. The secure physical container 416 may include an I/O port such that a terminal may be connected without opening the secure physical container 416. In another embodiment, the secure physical container 416 may first need to be unlocked before access to an I/O port is provided.

Some embodiments include a first watchdog module 402a operating on the same security server 412 as the key manager 410. A secure communication channel 420 may be used to connect the security server 412 to a second server, referred to as the resource server 414. The secure communication channel 420 may be informationally secure, such that any information traveling across the channel is encrypted. The secure communication channel may also be physically secure, such that it is difficult to intercept signals, encrypted or unencrypted, that are sent across the channel. For example, the secure communication channel 420 may comprise shielded cabling, metal guides, routing through a floor or ceiling, and/or the like.

A front end 408 for the web resource may operate on the resource server 414. In one embodiment where the web resource comprises Microsoft SharePoint®, the front end 408 may be comprised of a SharePoint® front end that is operated by a farm administrator. Also operating on the resource server 414 may be the transparent encryption module 404. In one embodiment, the front end 408 and the transparent encryption module 404 operate on the same resource server 414. The transparent encryption module 404 may be installed as a proxy or a reverse proxy for the web resource. In another embodiment, the transparent encryption module 404 and the front end 408 for the web resource are installed and operate on different servers that are communicatively coupled.

A second watchdog module 402b may also operate on the resource server 414. The second watchdog module 402b may be used in conjunction with the first watchdog module 402a to maintain, establish, and monitor the secure communication channel 420. The first watchdog module 402a and the second watchdog module 402b may also be used to monitor the security and health of both the security server 412 and the resource server 414. In one embodiment, the first watchdog module 402a may also include inputs connected to the secure physical container. These inputs may be used to detect a physical breach of the secure physical container 416. For example, a contact switch may be used on the lid of the secure physical container 416. The switch may provide an input alerting the first watchdog module 402a if the secure physical container 416 is opened without proper authorization.

The resource server 414 may be accessed via a network 406. The network 406 may be any type of network, such as those described in conjunction with FIG. 1, including the Internet, a local area network, a wide area network, and/or the like. Client devices 418 may be used to access the resource server 414 through the network 406. For example, if client device 418a attempts to store the file through the network 406 in the front end 408 of the web resource, the transparent encryption module 404 may intercept this transmission. The transparent encryption module 404 may first encrypt the file and then store it in the front end 408 in a manner that is transparent to a user of client device 418a. Similarly, if client device 418b attempts to download a file through the network 406 from the front end 408 of the web resource, the transparent encryption module may first intercept this request. The transparent encryption module 404 may then verify the credentials of the client device 418b against an access control list and/or an encryption policy, then decrypt the file and send it to the client device 418b in a manner that is transparent to a user.

It will be understood in light of this disclosure that the configuration shown in FIG. 4 is merely illustrative and is not meant to be limiting. Other configurations of servers and modules are contemplated by other embodiments that are not shown. For example, in one embodiment additional resource servers may be used in conjunction with the front end 408 to store and provide data for the web resource.

Figure 5:
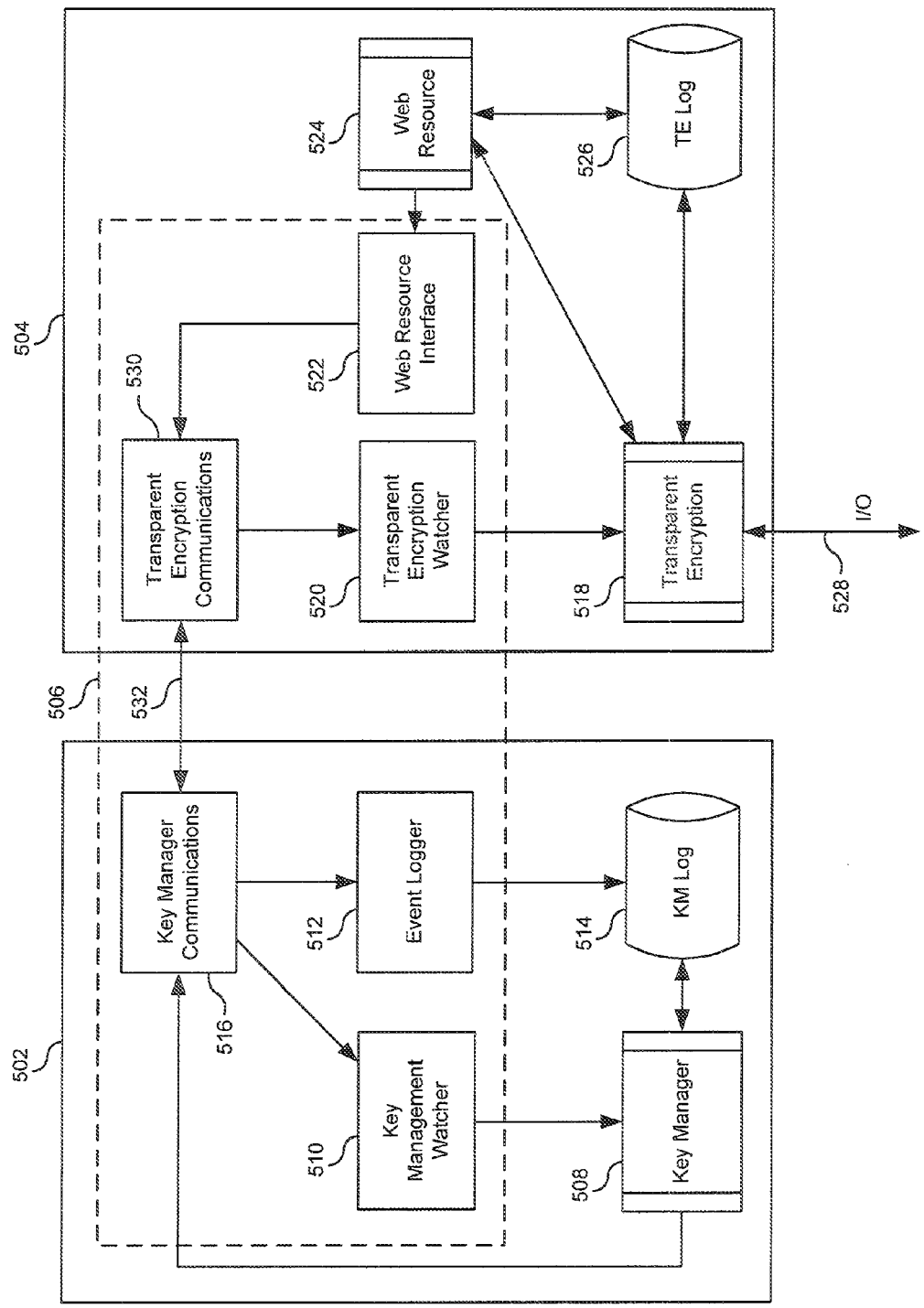
FIG. 5 illustrates a block diagram of a transparent encryption system, according to one embodiment.

FIG. 5 illustrates a block diagram 500 of a transparent encryption system, according to one embodiment. This embodiment includes two software modules running on two separate servers. The transparent encryption module 504 runs on a server separate from the key manager 502. The watchdog module 506 is split between the two servers. Half of the watchdog module 506 is distributed on the same server as the key manager 502. In this embodiment, the watchdog module 506 may be integrated with the key manager 502, such that they are operating from the same application or set of software processes. In another embodiment, the watchdog module 506 and the key manager 502 may be separate software processes that are communicatively coupled to one another.

Similarly, the watchdog module 506 may, or may not, be integrated with the transparent encryption module 504 in the same software process, according to various embodiments.

The watchdog module 506 includes a key manager communication module 516 and a transparent encryption communication module 530. These two modules may operate in conjunction with one another to establish a secure communication channel 532. Additionally, the watchdog module 506 may include a key management watcher 510. The key management watcher 510 may be used to monitor the health and integrity of the key manager 508. In one embodiment, the key management watcher 510 may monitor the key manager 508 to ensure that its configuration is not changed without authorization. The key management watcher 510 may also monitor the key manager 508 to ensure that no other software is inserted between the key manager 508 and the transparent encryption module 518. The key management watcher 510 may also ensure that no other software is operating on the key management server that may be used to monitor or otherwise compromise information created and/or stored by the key manager 508.

Similarly, the watchdog module 506 may include a transparent encryption watcher 520. The transparent encryption watcher may be used to monitor the transparent encryption module 518. The transparent encryption watcher 520 may perform many of the same functions that are performed by the key management watcher 510, such as detecting changes to the configuration of the transparent encryption module 518. Additionally, the transparent encryption watcher 520 may monitor the resource server in order to detect any software inserted between the transparent encryption module 518 and the web resource 524. The transparent encryption watcher 520 may also monitor the resource server in order to detect any software inserted between the transparent encryption module 518 and an I/O port 528.

The watchdog module may also include a web resource interface 522 to provide access to the web resource 524. The web resource interface 522 may be used to extract information from the web resource 524 the may be needed to encrypt the files or resources residing thereon. In one embodiment, the web resource interface 522 collects the user list from the web resource 524. In another embodiment, the web resource interface 522 collects a topology of the files residing on the web resource 524, possibly in the form of the file structure, resource list, XML document, and/or the like.

Furthermore, the watchdog module 506 may include an event logger 512. The event logger 512 may be used to log all encryption events, such as requests to encrypt or decrypt a file from a client device received over the I/O port 528. The event logger 512 may also be used to log security events, such as changes to the configuration of the key manager 508 or the transparent encryption module 518. The event logger 512 may also log error messages, such as detecting that the key is expired or is deactivated, or that a file within the web resource 524 is not encrypted according to its access control list specifications. The event logger 512 may record events and messages in a key manager log 514, along with a transparent encryption log 526 according to where the events take place, or where the messages are directed. In another embodiment, the event logger 512 only logs events to the key manager log 514.

In one embodiment, the various modules in FIG. 5 may reside on separate computer systems. Alternatively, multiple modules may be combined on the same or similar computer systems. In addition, some modules may be combined together into a single module performing the functions of both individual modules. Similarly, a single module may be split into multiple modules. It will be understood in light of this disclosure that any arrangement of the modules, as well as any implementation in both software and hardware, may be used by various embodiments.

Described below are a number of methods and processes that may be performed by the transparent encryption module 518, the key manager 508, and/or the watchdog module 506. These methods may be performed on a computer system in a networked environment according to FIG. 1 and FIG. 2. These methods and processes may also be performed using the configurations of hardware and software discussed in FIG. 3, FIG. 4, and FIG. 5, along with other configurations not explicitly shown, but that are readily apparent in light of this disclosure. Each step of these methods may be done automatically by the computer system, and/or may be provided as inputs and/or outputs to a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a Web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Therefore, it will be understood in light of this disclosure, that each step and each method described herein may be altered to include an input and output to and from a user, or may be done automatically by a computer system.

Figure 6:
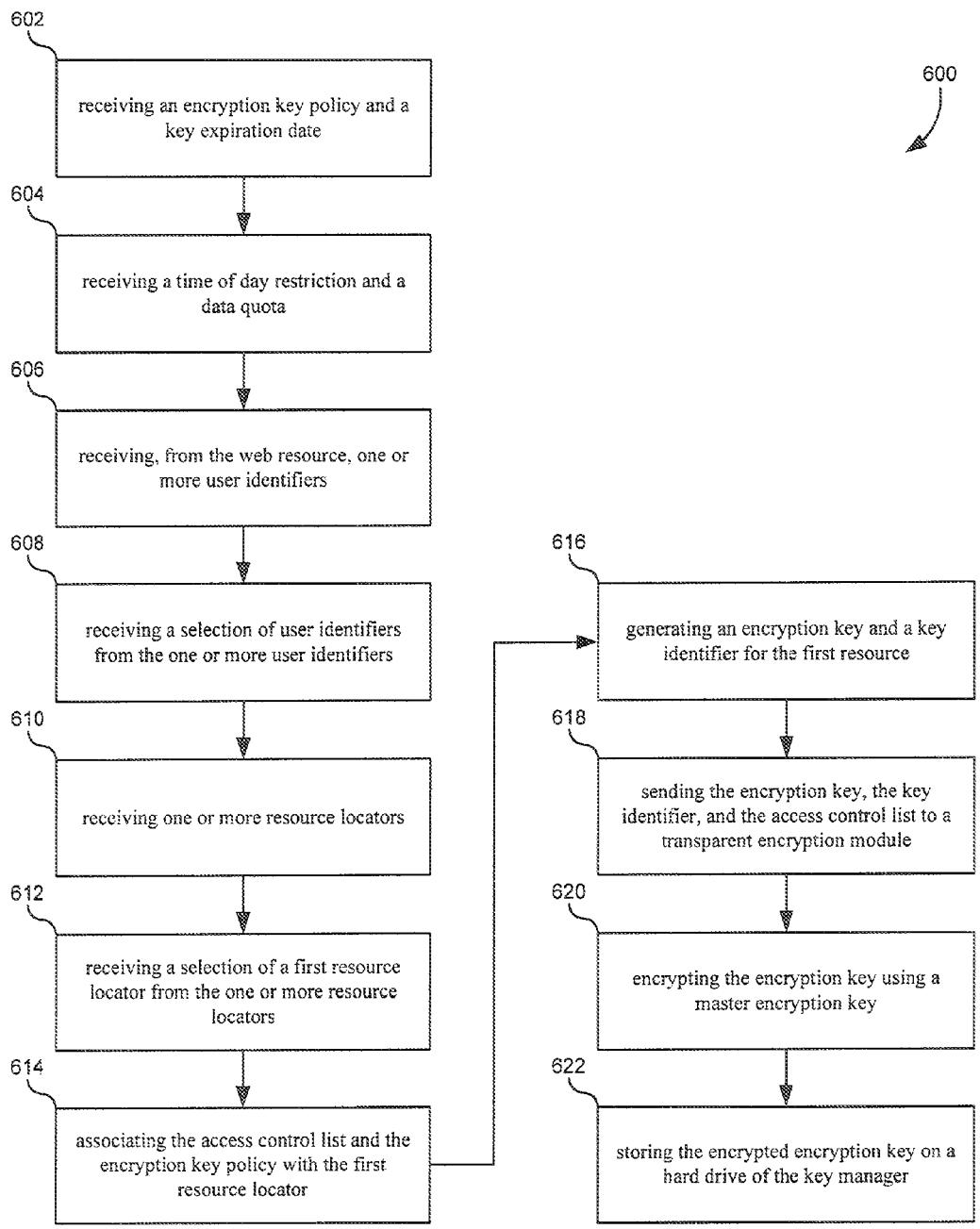
FIG. 6 illustrates a simplified flowchart of a method of managing a security policy for a web resource by a key manager.

FIG. 6 illustrates a simplified flowchart 600 of a method of managing a security policy for a web resource by a key manager. Specifically, flowchart 600 illustrates a method of generating and managing a set of encryption keys for a particular resource by the key manager. The method may include receiving an encryption key policy and a key expiration date (602). In one embodiment, the encryption key policy and the key expiration date are received from a user interface designed to allow a security administrator to define encryption key policies that meet specific compliance needs. The interface may also be used to grant access privileges to specific users, or groups of users, and apply conditional access rules to be later used in forming an access control list.

In one embodiment the encryption key policy may be comprised of a policy name, an encryption algorithm, a key lifetime, a key length, and/or a creation date. The encryption algorithm may be AES, RSA, and/or the like. The encryption algorithm may also be determined by an external standard. For example, in order to protect data under the HIPAA standard, the policy name may be HIPAA_HITECH, or something similar, and the key length and encryption algorithm may be determined by this standard. The key lifetime may be related to the key expiration date. The key lifetime may be a directive to change the key within a selected number of years. For example, a key can be changed every one year, every three months, and/or the like, depending on the security requirements. This value may instruct the key manager to issue a new data encryption key every year or every three months, depending on the selection. Any time period may be used for the key lifetime.

Additionally, a key length may be selected. For example, a selection of 256 bits may be made specifying the number of bits to be used in the encryption key. The creation date may also be specified. In one embodiment the creation date may be used in conjunction with the key lifetime to determine when a replacement key may be generated. The key expiration date may be a value that will instruct the transparent encryption module to no longer use this key to encrypt data. As used herein, and "expired" key is one that will no longer be allowed to encrypt data. However, an expired key may be used to decrypt data. There may be cases where a new key has been reissued according to the key lifetime, while older keys still remain unexpired. In contrast, a "deactivated" key is one that may no longer be used to either encrypt or decrypt data. Keys may be manually deactivated by a security administrator. Alternatively or additionally, keys may be deactivated according to input as part of the encryption key policy, similar to how keys may be expired according to the encryption key policy. In one embodiment, keys may be deactivated after a time period following their expiration. For example, expired keys may automatically be deactivated two years after their expiration. The length of time an expired key may be used to decrypt content before being deactivated may be referred to as a deactivation interval.

In one embodiment, both the expiration and deactivation time periods may be measured in whole years. According to the encryption key policy, each key may have an indicator of state such as active, expired, deactivated, or destroyed. In another embodiment, an expiration value of '0' for a key indicates a key that never expires. Similarly, a maximum deactivation interval may be specified, such as 30 years. In some embodiments, the key manager is responsible for tracking key expiration deactivation. This may be accomplished by scheduling events when keys are expired or deactivated, or may be analyzed in batches during regular intervals, such as daily. The security administrator also may at any time change and encryption key policy. The state of any keys affected by the change policy may be immediately updated. For example, if the expiration date of a key is moved behind the current date, then the status of the key may be changed from active to expired as soon as the change is saved.

The method may also include receiving a time of day restriction and a data quota (604). In one embodiment, each user may have been assigned window of time during which access will be granted to the web resource. For example, users in the Western Hemisphere may be granted access during normal working hours such as 7 AM to 7 PM, while workers in the eastern hemisphere may be granted access during their normal working hours such as 7 PM to 7 AM Western time. In another embodiment, the time of day restriction may include an expiration date for the user's access rights. Therefore, the user may be granted access for a one week period while assigned to a particular task. The data quota may be a number of bytes that may be downloaded. Alternatively, the data quota may be a number of files that may be downloaded. The data quota may be defined in conjunction with a time period. For example, the data quota may limit a user downloads to 50 files over a one-week window.

The method may additionally include receiving, from the web resource, one or more user identifiers (606). In one embodiment, the web resource operates on a separate server. Therefore, the key manager may use the watchdog to communicate with the other server and provide an interface to the web resource. In an embodiment where the web resource comprises Microsoft SharePoint®, the watchdog may collect user information through the SharePoint® API. The watchdog may then provide the user information to the key manager, and the key manager may then format the user information from SharePoint® into a list of users designated by user identifiers that may be granted or denied access to the SharePoint® files protected by the transparent encryption module. User identifiers may comprise a username, an ID number, a Social Security number, an employee number, and/or the like.

The method may further include receiving a selection of user identifiers from the one or more user identifiers (608). The selection of user identifiers may be made through the same interface as was used to select options for the encryption key policy. The selection user identifiers may also made through a separate interface configured to display the list of user identifiers acquired from the web resource. Selecting the user identifiers may also comprise defining an access control list. In one embodiment, the access control list may be based on the selection of user identifiers, the encryption key policy, the time of day restriction, and the data quota. In another embodiment, a number of different control options may be presented to the user for selection. These options may include "none", where the transparent encryption system does not provide any additional access control, and instead relies on the permissions of the web resource. Another option may be "block administrators", which denies access to any user that has an administrative role defined within the web resource, and may leave all other web resource permissions unaffected. This control option may protect against malicious users with administrative privileges such as a farm administrator. An additional option may include "specified users", which allows the transparent encryption system to enforce its own access control list based on the selection of user identifiers. This option may be used to tightly control which users access decrypted content from the web resource from client devices. The access control list may incorporate the time of day restrictions and data quota for each user identifier and may be unique to each user identifier. Alternatively, these restrictions may be applied to groups of user identifiers.

The method may additionally include receiving one or more resource locators (610). In one embodiment, the one or more resource locators are received from the web resource on the separate server. The resource identifiers may be received in the same way that the user identifiers are received. For example, the watchdog module may interact with the SharePoint® API to retrieve a topology, or file structure of the data stored within a farm. The watchdog may return a collection of URLs that may be utilized to access data in the web resource. The key manager may format the list into a set of libraries or directories which can be protected by the transparent encryption invention.

The method may further include receiving a selection of a first resource locator from the one or more resource locators (612). In one embodiment, an interface may be provided with a listing of the URLs retrieved from the web resource and formatted by the key manager. The user may select the file, library, directory, or other groupings of resources to which an access control list may be applied. Therefore, the first resource locator may be comprised of a single file or a group of files. The method may also include associating the access control list and the encryption key policy with the first resource locator (614). For example, a user may be provided with an interface allowing the user to select the first resource locator, a group of one or more user identifiers, and encryption policy to apply to the first resource locator. This association may be made in many different ways. In one embodiment the user identifiers, encryption policy, key expirations, time of day restrictions and data quotas, may be combined together in the form of a single access control list. Therefore, the access control list may contain all the information needed to determine whether a particular user can encrypt or decrypt a resource associated with the first resource locator in the web resource.

The method may additionally include generating an encryption key and a key identifier for the first resource (616). In one embodiment, the FIPS 140-2 standard may be used to generate a symmetric encryption key. For Windows® applications, the function bcryptGenRandom( ) may be used. Also, the key manager may support AES key lengths of 128 bits or 256 bits, along with other encryption standards and key lengths. In one embodiment, the key manager does not generate the encryption key until the mechanism to secure the key has been activated and verified to be operating correctly by the watchdog module. Additionally, a key identifier may comprise a globally unique ID to uniquely identify each key. Each encryption key may use the key ID to uniquely identify the repository or repositories it encrypts. The key ID may be a global counter, or it may be generated by the same process used to generate the encryption key itself.

The method may further include sending the encryption key, the key identifier, and the access control list to a transparent encryption module (618). In one embodiment, the transparent encryption module is communicatively coupled to the web resource, and the transparent encryption module is located on the separate server. Communication between the transparent encryption module and the key manager may be facilitated by the watchdog, where the watchdog comprises two modules, one operating on each server. Both the transparent encryption module and the key manager may create their own self signed RSA x.509 public-key certificates. The private portion of these keys need not leave the respective servers. For passing the key, the key manager may create a one-time use AES key, and use that AES key to encrypt the AES key encryptor key (KEK) used to encrypt the encryption key. The transparent encryption module's public key from the RSA x.509 public-key certificate may be used. The transparent encryption module may then decrypt the AES KEK with its private key, use the AES KEK to decrypt the encryption key, and then destroy the AES KEK. In another embodiment, the NIST standard for using AES KEK (Google "AES wrapping key") may be used. This may provide sufficient integrity for data checking and authentication.

In another embodiment, the watchdog service may use the standard Secure Socket Layer (SSL) of the Transport Layer Security (TSL) to pass keys between the key manager and the transparent encryption module, along with the self-signed certificates. In this case, both the key manage-side of the watchdog and the transparent encryption module-side of the watchdog may act as both a client and a server, i.e. they both may act as listeners to determine if the other side is attempting to communicate. Thus, they may both generate self-signed certificates when acting in a server role, and receive the signed data packets when acting in a client role.

The method may also include encrypting the encryption key using a master encryption key (620). When the encryption key is created, it is stored in protected memory on the key manager server. This prevents any other application other than the key manager from having access to the encryption key. In one embodiment, the key manager does not display or disclose the encryption key in an unencrypted form. The KEK used to encrypt the key during transmission to the transparent encryption module may be used to encrypt encryption key itself for storage on by the key manager. In one embodiment, the KEK is an RSA key pair of a minimum length of 2048 bits. In Windows® systems, the KEK key pair may be stored in the Microsoft CNG key store. The private portion of the KEK may be protected by a master RSA key pair of length equal to or greater than the KEK length. To provide additional security, the master key pair may be salted with a random recoverable value and stored in the Microsoft CNG key store. The key metadata, including the keys state, age, maximum lifetime, and unique identifier may also be stored with the encryption key.

The method may additionally include storing the encrypted encryption key on a hard drive of the key manager (622). In one embodiment, the hard drive is physically secured from a web resource administrator of the separate server, such as a farm administrator for SharePoint®. In another embodiment, the stored encryption key be only be accessed using the master encryption key. The master encryption keg's may require two-person control. This may include to two or three security administrators supplying a password or other form of credential to the key manager. Each platform hosting a key manager may have different methods available for implementing the encryption techniques described above. The key manager may take advantage of what is available so long as the encryption keys are accessible only to the key manager, and access to unencrypted keys is only given via predefined multi-person authorization.

Figure 7:
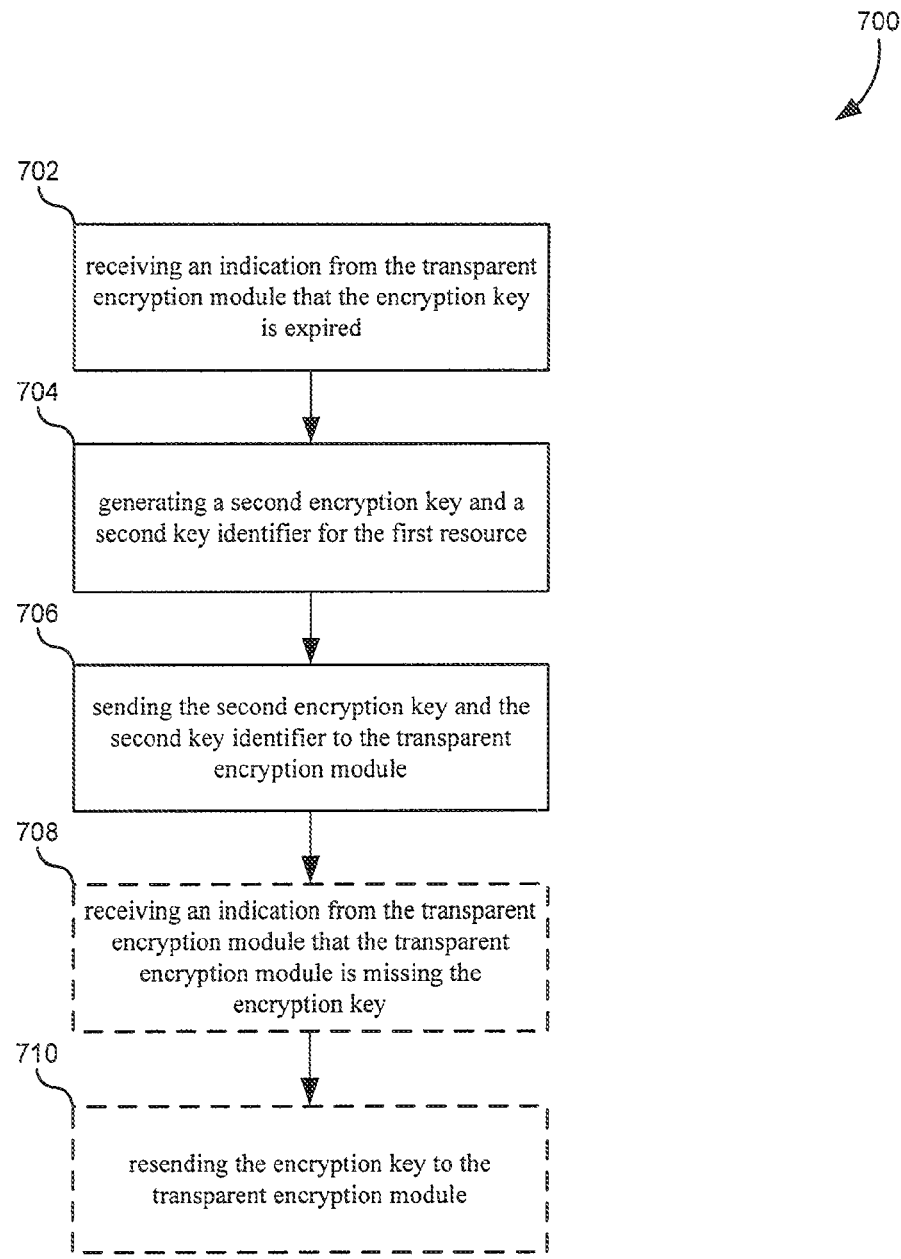
FIG. 7 illustrates a simplified flowchart of a method of maintaining a security policy for a web resource by a key manager, according to one embodiment.

FIG. 7 illustrates a simplified flowchart 700 of a method of maintaining a security policy for a web resource by a key manager, according to one embodiment. In this case, the key manager may have already followed the method of FIG. 6 to send the encryption key to the transparent encryption manager. However, there are a number of cases where new keys may need to be generated for a particular resource, or where existing keys may need to be retransmitted. For example, the method may include receiving an indication from the transparent encryption module that the encryption key is expired according to the encryption key policy (702). In one embodiment, expired keys may reside in the transparent encryption module until it attempts to encrypt a file using the expired key. At that point, the transparent encryption module may send a notification to the key manager that a key for a certain resource is expired. Alternatively, the key manager may actively monitor the state and expiration of any keys. In this case, when a key expires the key manager may automatically generate new keys and cause the transparent encryption module to re-encrypt the data in the web resource.

The method may further include generating a second encryption key and a second key identifier for the first resource (704). In embodiments where the key manager waits for notification from the transparent encryption module alerting it to the presence of expired keys, the key manager may respond by generating a new encryption key and associating it with the access control list and the resource of expired key. The key manager may then initiate a process by which all data encrypted with the expired key web resource is re-encrypted using the new key. Alternatively, the transparent encryption module may instead automatically detect resources encrypted with the expired key and encrypt them with the new key as they are accessed by client devices in a JIT fashion. The method may also include sending the second encryption key and the second key identifier to the transparent encryption module (706). The second encryption key (the new encryption key) and the second key identifier may be sent to the transparent encryption module via the watchdog module as described above.

In one embodiment, the transparent encryption module stores the keys, key identifiers, and access control lists in protected memory. Thus, the transparent encryption module may rarely need keys to be transmitted during routine encryption and decryption operations. However, occasionally the transparent encryption module may not have an encryption key referenced by a key identifier stored in protected memory. In these cases, the transparent encryption module may request that the key the resent from the key manager. Therefore, the method for maintaining the security policy by the key manager may additionally include receiving an indication from the transparent encryption module that the transparent encryption module is missing the encryption key (708). Even if a key is missing on the transparent encryption module, the key should still be accessible to the key manager in its protected memory, hard disk, and/or backup data store. The method may further include resending the encryption key to the transparent encryption module (710). This may follow the same procedure used to send the encryption key originally.

In one embodiment it may be desirable to destroy keys as a means for housecleaning and keeping the keys current. Generally, active and expired keys are not destroyed. In one embodiment, deactivated keys maybe destroyed according to their associated encryption policy. In another embodiment, deactivated keys may be destroyed that are associated with a particular library or farm in the web resource. In another embodiment, the key manager may receive a human input from a security administrator, including a confirmation, in order to destroy any keys. In yet another embodiment, the key manager may require security administrators to approve the destruction of any keys. Destroying a key may result in changing the key state to "destroyed". In yet another embodiment, the key manager only destroys the key itself while leaving the other key metadata intact for forensics, compliance, and to ensure that a key ID is not reused inadvertently.

Because keys may be destroyed, or lost for other reasons, the key manager may backup active, expired, deactivated, and destroy keys. Generally, backed up keys should be stored in a state that meets or exceeds the security of the key manager. One embodiment, the security of the keys is maintained by wrapping the backed up keys with a PKCS#5 key word shared secret algorithm, such as Shamir's Secret Sharing Scheme (SSSS) based on a security administrator's password(s).

Figure 8:
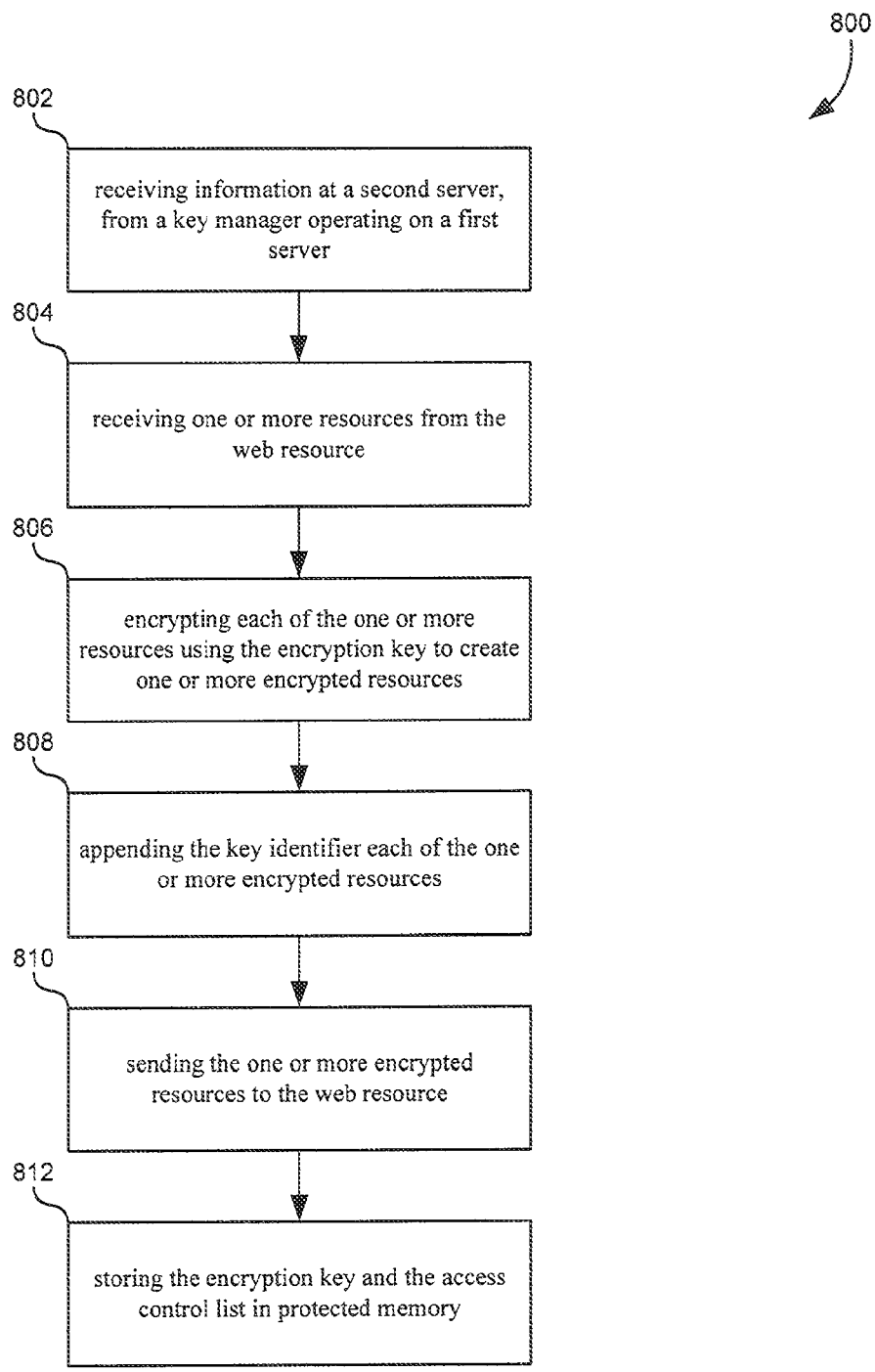
FIG. 8 illustrates a flowchart of a method of providing transparent encryption for a web resource, according to one embodiment.

Turning now to the transparent encryption module, a number of methods and processes described below may be performed by a computer system to transparently protect data within the web repository. FIG. 8 illustrates a flowchart 800 of a method of providing transparent encryption for a web resource, according to one embodiment. The method may include receiving information at a second server, from a key manager operating on a first server (802). In one embodiment, the information comprises an encryption key, a key identifier, an access control list, and/or one or more resource locators. This information may be received response to request issued by the transparent encryption module, or it may be received when it is generated by the key manager.

The method may also include receiving one or more resources from the web resource (804). In one embodiment, each resource corresponds to one of the one or more resource locators. In one embodiment, the transparent encryption module may request each of the one or more resources from the web resource in response to receiving information from the key manager. For example, the transparent encryption module may receive an access control list an encryption key for a list of resources. These resources may then be retrieved from the web resource to be encrypted by the encryption key according to the access control list. In one embodiment where the web resource comprises Microsoft SharePoint®, resources may be retrieved using SharePoint®'s forms and standard API.

The method may additionally include encrypting each of the one or more resources using the encryption key to create one or more encrypted resources (806). Encryption of the one or more resources may take place immediately upon their retrieval. In another embodiment, encryption of the one or more resources may take place according to a scheduled interval, such as once per day. In another embodiment, encryption of the one or more resources might not take place until they are requested by a client device, i.e. according to a JIT protocol.

In one embodiment, the resources are each encrypted as a complete document, as opposed to encrypting each field in the document individually. When fields are encrypted individually, they provide more attempts for a hacker to break the encryption code, therefore it is more desirable to encode the document in a single operation. Format preserving encryption may be used; however, it may not be reliable enough to preserve the format such that SharePoint® will accept the encrypted form. Therefore, in one embodiment, SharePoint® form may be populated with placeholders that link to areas of the encrypted resource, and the encrypted resource may be submitted to the SharePoint® API in as an attachment to the standard form.

The method may further include appending the key identifier to each of the one or more encrypted resources (808). The key identifier may be used to link the encrypted resource to the proper encryption key stored in protected memory of the transparent encryption module during a future decryption operation. In an alternative embodiment, the key identifier may be stored in a table along with a reference to the resource and the encryption key such that the table may be used to link a file to its encryption key. The method may also include sending the one or more encrypted resources to the web resource (810). In embodiments where the web resource is comprised of SharePoint®, the SharePoint® form containing the placeholder references along with the encrypted resource as an attachment may be submitted using the SharePoint® API.

The method may additionally include storing the encryption key and the access control list in protected memory (812). In one embodiment, the transparent encryption module prevents the encryption key and the access control list from being stored on a hard disk. This may prevent other software processes running on the server from accessing encryption keys, as well as a resource administrator such as a farm administrator from being able access the encryption keys. In another embodiment, at least a part of the web resource operates on the second server, and the protected memory is not accessible by a web resource administrator of the second server. Therefore, the protected memory may need to actually prevent other software processes from accessing the data therein.

Figure 9:
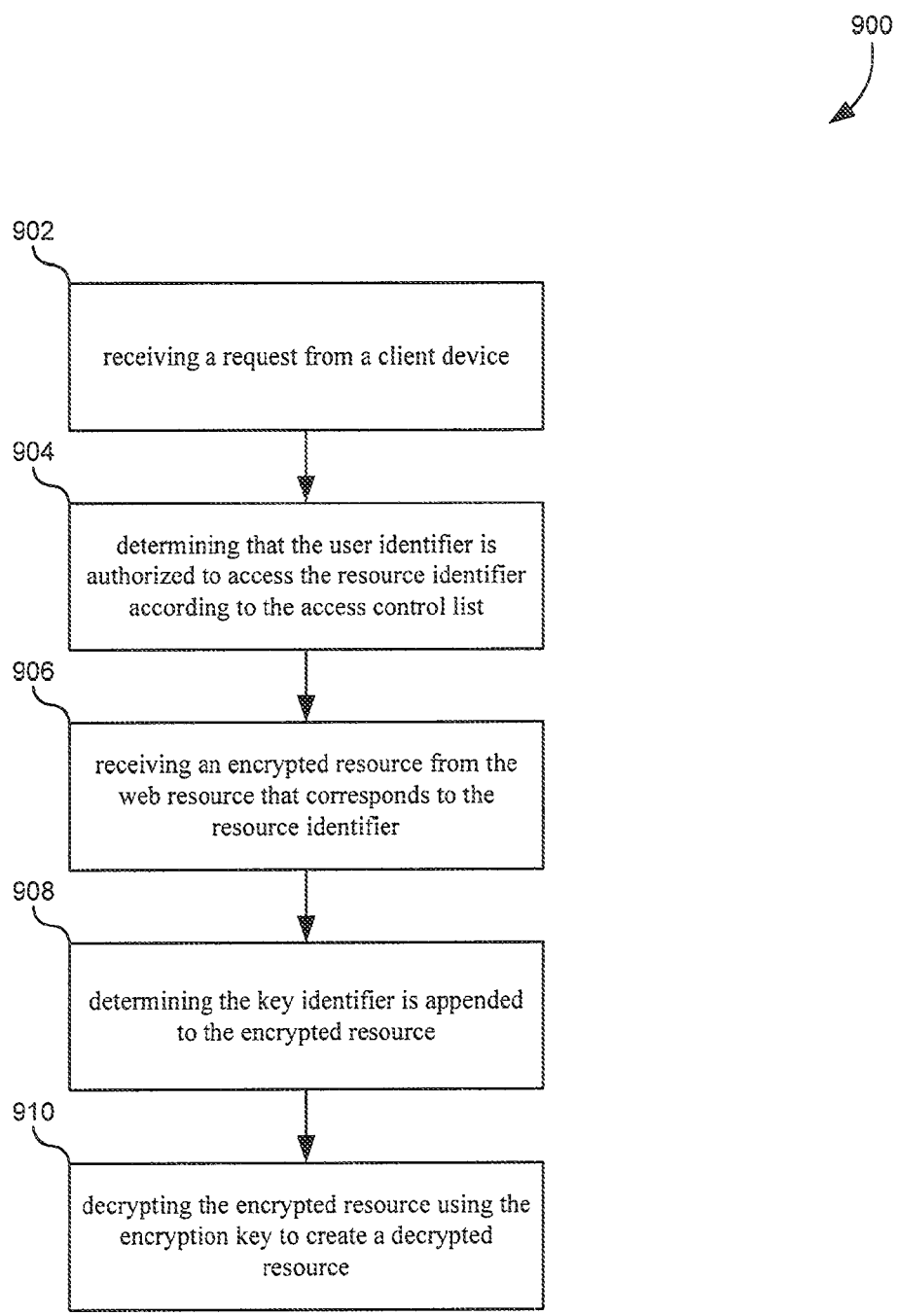
FIG. 9 illustrates a flowchart of a method of transparently providing an encrypted resource from a web resource, according to one embodiment.

FIG. 9 illustrates a flowchart 900 of a method of transparently providing an encrypted resource from a web resource, according to one embodiment. After a resource or set of resources have been encrypted and stored in the web resource, a client device may attempt to access one or more of the encrypted resources. In this method, the transparent encryption module may intercept requests and either encrypt or decrypt the files from the client device. This operation may be completely transparent to the client device unless it tries to access an unauthorized file. Even then, the client device may be directed to a standard SharePoint® error page indicating that the resource is unavailable or not found.

First, the method may include receiving a request from a client device (902). In one embodiment, the request comprises a resource identifier and/or a user identifier. In cases where the client device is requesting a resource, the transparent encryption module may intercept the request and parse it to extract the resource locator and the user identifier. The request may then be reformulated and forwarded on to the web resource in a format that will request the encrypted resource rather than the unencrypted resource of the original request.

The method may further include determining that the user identifier is authorized to access the resource according to the access control list (904). In one embodiment, the user identifier may be compared to a list of user identifiers in the access control list to determine whether this user identifier is authorized actions resource. In another embodiment, this determination may further comprise determining that a time of day of the request does not violate a time-of-day restriction according to the access control list. For example, user identifier may only be approved for access during working hours. If the request is submitted after working hours, the request may be denied. In another embodiment, this determination may further comprise determining that a data amount associated with the request does not violate a data quota according to the access control list. For example, a data quota the comprised of a ten-file-per-day limit. If the request would exceed the ten-file-per-day limit, then the request may be denied. Furthermore, this determination may further comprise determining that the encryption key is not deactivated. As described above, deactivated keys are not allowed to decrypt information.

The method may also include receiving an encrypted resource from the web resource that corresponds to the resource identifier (906). This may be in response to the reformulated request made by the transparent encryption module to the web resource. In one embodiment, it may be determined that the resource associated with the resource identifier is not encrypted in the web resource as it should be. In this case, the method may further include sending a message to key manager operating on the first server indicating that the resource is not encrypted, and directing the client device to an error page.

The method may additionally include determining that the key identifier is appended to the encrypted resource (908). If no key identifier is appended to the encrypted resource, then an error message may be sent to the key manager. The key identifier is used to lookup the encryption key used to encrypt the encrypted resource. In one embodiment, it may be determined that the encryption key associated with the key identifier is deactivated, in which case the web resource may not be decrypted using the deactivated encryption key. In this case, the method may further include sending an indication to the key manager and/or displaying an error message for the client device. In another embodiment, it may be determined that the encryption key is expired. Although the expired encryption key may be used to decrypt the file, it may not be used to re-encrypt the file when it is posted by the client device. Therefore the transparent encryption module may send an indication to the key manager indicating that a new encryption key may be needed. If instead of a request for a resource, the client device requests the posting of a resource, then the expired key may generate a message to the client device that resource cannot be posted.

The method may further include decrypting the encrypted resource using the encryption key to create a decrypted resource (910). After decryption, the decrypted resource may be sent to the client device. Additionally, after the process is complete any data related to the data encryption key may be destroyed securely. According to one embodiment, the transparent encryption module may fill the used memory space with '1' bits and mark it for garbage collection.

Figure 10:
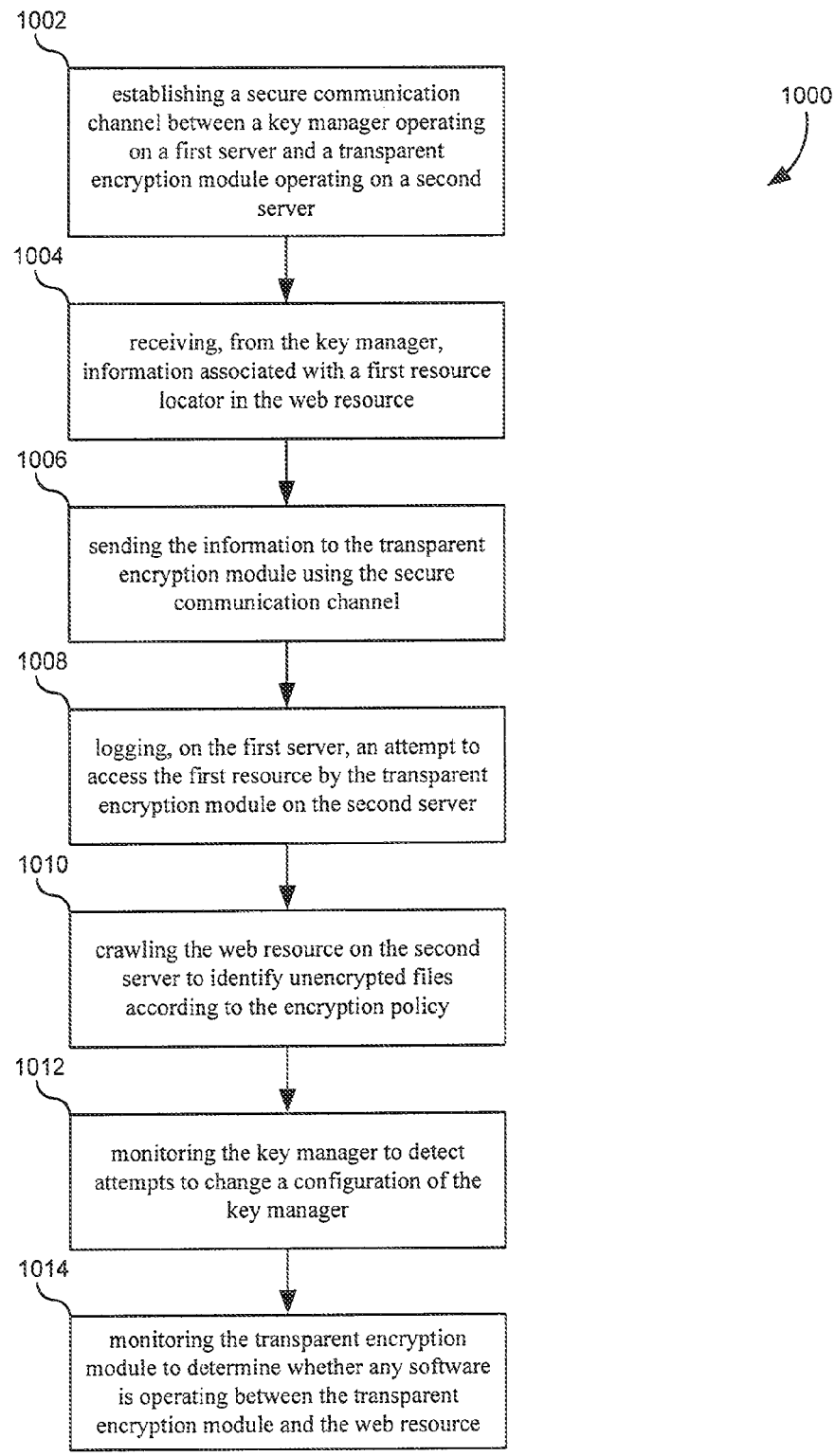
FIG. 10 illustrates a flowchart of a method of maintaining the integrity of a transparent encryption system for a web resource by a watchdog function, according to one embodiment.

Turning now to the watchdog module, a number of methods and processes described below may be performed by a computer system to protect data within the web repository. FIG. 10 illustrates a flowchart 1000 of a method of maintaining the integrity of a transparent encryption system for a web resource by a watchdog function, according to one embodiment. Generally, the watchdog function may be configured to detect and protect against tampering with the transparent encryption system. The method may include establishing a secure communication channel between a key manager operating on a first server and a transparent encryption module operating on a second server (1002). In one embodiment, the watchdog function may be split into two modules, namely a first watchdog module and a second watchdog module. The first watchdog module may reside on the key manager server as part of key manager software, and the second watchdog module may operate on the other resource server as part of the transparent encryption module software. The secure communications channel may be implemented using the encryption scheme described above. In one embodiment, the watchdog may be configured to detect tampering with the secure communications channel, along with attempts to eavesdrop while encryption keys are being transmitted between the two servers.

The method may further include receiving, from the key manager, information associated with a first resource locator in the web resource (1004). In one embodiment, the information includes an encryption policy, an encryption key, a key identifier, and/or an access control list. Other information may be received from the key manager, such as configuration information, operating constraints, and other data that may be used to control how the transparent encryption module behaves. In one embodiment, a security administrator may have access to the key manager without having access to the transparent encryption module. Therefore, the security administrator may use the key manager to adjust the operating conditions of the transparent encryption module, as well as the key manager. These operating conditions may be received through a user interface of the key manager.

The method may also include sending the information to the transparent encryption module using the secure communication channel (1006). In one embodiment, only encryption-related information may be transmitted securely, while in another embodiment all the information transmitted between the key manager and the transparent encryption module may be transmitted securely.

The method may additionally include logging, on the first server, an attempt to access the first resource by the transparent encryption module on the second server (1008). In one embodiment, every encryption-related event that is detected by the transparent encryption module may be sent to the key manager module by the watchdog and logged. In another embodiment, routine encryption and decryption need not be logged; however, abnormal events, errors, and unauthorized access attempts may be logged. In one embodiment, information associated with the encryption events may be transmitted over the secure communication channel to the watchdog module on the key manager server. The event information may then be analyzed by the watchdog module and logged on the key manager server. In yet another embodiment, the watchdog module operating on the resource server may keep its own log operated in conjunction with a log on the key manager server. In this case, both logs record information associated with their respective portions of the watchdog module.

The method may further include crawling the web resource on the second server to identify unencrypted files according to the encryption policy (1010). The watchdog module may crawl the web resource using the web resource interface, such as the SharePoint® APL. Watchdog module may crawl the web resource at regularly scheduled intervals, when directed by the key manager or a security administrator, and/or upon the occurrence of an event. If the watchdog detects unencrypted resources within the web resource that should be encrypted according to an access control list, the watchdog may initiate an action directing the transparent encryption module to retrieve the unencrypted resource, encrypted resource, and return the resource to the web resource. Alternatively or additionally, the watchdog may send an error message to the key manager indicating that the unencrypted resource was discovered.

The method may also include monitoring the key manager to detect attempts to change a configuration of the key manager (1012). In one embodiment, the watchdog detects changes to the configuration of the key manager that do not have security administrator approval. In another embodiment, the watchdog may detect error messages sent to the key manager that are not followed by an appropriate or expected action by the key manager. This may indicate the key manager has been altered to ignore critical error messages. In another embodiment, the watchdog may monitor the physical security of the key manager and/or a secure physical container housing the key manager server. For example, the watchdog may detect attempts by unauthorized personnel to gain physical access to the key manager server using a variety of sensors. In yet another embodiment, the watchdog may monitor the key manager server to ensure that no unauthorized software processes are operating on the server. If unauthorized processes are detected, the watchdog may in some cases take action to disable the unauthorized software processes.

The method may additionally include monitoring the transparent encryption module to determine whether any software is operating between the transparent encryption module and the web resource (1014). Specifically, the watchdog function may monitor the inputs and outputs of the transparent encryption module and determine whether any other software processes are attempting to eavesdrop, intercept, or monitor transmissions. The watchdog may monitor both the interface between the transparent encryption module and the client device over the network, as well as the interface between the transparent encryption module and the web resource. As with the key manager, the watchdog may also monitor attempts to change the configuration of the transparent encryption module without authorization.

When the watchdog detects unauthorized events, access attempts, process, and/or the like, various embodiments may take different courses of action. In one embodiment, unauthorized events, attempts, and/or processes may be categorized according to severity, and any action taken in response thereto may be proportional to the severity. In one embodiment, the watchdog may send warning messages to the security administrator via the key manager. In another embodiment, the watchdog may disable portions of the key manager or the transparent encryption module to prevent security leaks. For example, any unauthorized attempts to access the encryption keys in the transparent encryption module's protected memory may cause the transparent encryption module to flush the protected memory and garbage collect its contents. This may require subsequent retransmission of any encryption keys by the key manager after authorization has been given by a security administrator. In another embodiment, certain user identifiers or client devices may be prohibited from future access to the web resource. In another embodiment, any resources within the web resource that are thought to have been compromised may be restricted from future decryption until authorized by a security administrator.

It should be appreciated that the specific steps illustrated in these figures provide particular methods of implementing and operating a transparent encryption system according to embodiments of the present invention. Other sequences of steps may also be performed according to alternative embodiments. For example, alternative embodiments of the present invention may perform the steps outlined above in a different order. Moreover, the individual steps illustrated in these figures may include multiple sub-steps that may be performed in various sequences as appropriate to the individual step. Furthermore, additional steps may be added or removed depending on the particular applications. One of ordinary skill in the art would recognize many variations, modifications, and alternatives It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

It will be understood in light of this disclosure that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of providing transparent encryption for a web resource, the method comprising:

receiving, at a key manager operating on a first server, an encryption key policy;

receiving, at the key manager, from the web resource, one or more user identifiers and one or more resource locators, wherein the web resource comprises a file store accessible to a plurality of users and is operated by a resource administrator;

defining, at the key manager, an access control list based on a selection of user identifiers;

associating, at the key manager, the access control list and the encryption key policy with a first resource locator from the one or more resource locators;

generating, at the key manager, an encryption key and a key identifier for the first resource locator;

establishing, by a first watchdog module operating on the first server, a secure communication channel between the first watchdog module and a second watchdog module operating on a second server;

sending, from the first watchdog module, to the second watchdog module, encryption information using the secure communication channel, wherein the encryption information comprises: the encryption key, the key identifier, and the access control list;

storing, at a transparent encryption module on the second server, the encryption key and the access control list in protected memory;

receiving, at the transparent encryption module, from a client device, an input comprising a request to access a first resource stored in the web resource and a user identifier;

determining, at the transparent encryption module, that the user identifier is included in the access control list for the first resource;
encrypting, at the transparent encryption module, using the encryption key, data that is passed from the client device to the first resource; and
decrypting, at the transparent encryption module, using the encryption key, data that is passed from the first resource to the client device.

2. The method of claim 1 wherein:
the web resource comprises MICROSOFT SHAREPOINT;
the first server is physically secured from the second server;
the resource administrator is denied access to the first server; and
the resource administrator is denied access to the protected memory on the second server.

3. The method of claim 1 further comprising:
encrypting, by the key manager on the first server, the encryption key using a master encryption key, wherein the master encryption key requires two security administrator passwords to access; and
storing, by the key manager, the encrypted encryption key on a hard drive on the first server.

4. The method of claim 1 further comprising:
determining, at the transparent encryption module, that a time of day of the input does not violate a time of day restriction;
determining, at the transparent encryption module, that a data amount associated with the user identifier does not violate a data threshold; and
determining, at the transparent encryption module, that the encryption key is not expired according to a key expiration date;
wherein the access control list comprises the time of day restriction, the data threshold, and the key expiration date.

5. The method of claim 1 further comprising:
monitoring, by the first watchdog module, the key manager to detect attempts to change a configuration of the key manager; and
monitoring, by the second watchdog module, the transparent encryption module to determine whether any software is operating between the transparent encryption module and the web resource; and
logging, on the first server, by the first watchdog module, events involving the transparent encryption module on the second server.

6. A method of providing transparent encryption for a web resource, the method comprising:
receiving, at a second server, from a key manager operating on a first server, information comprising:
an encryption key;
a key identifier;
an access control list; and
one or more resource locators;
receiving one or more resources from the web resource, wherein each resource corresponds to one of the one or more resource locators;
encrypting each of the one or more resources using the encryption key to create one or more encrypted resources;
appending the key identifier to each of the one or more encrypted resources;
sending the one or more encrypted resources to the web resource; and
storing the encryption key and the access control list in protected memory, while preventing the encryption key and the access control list from being stored on a hard disk, wherein:
at least a part of the web resource operates on the second server; and
the protected memory is not accessible by a web resource administrator of the second server.

7. The method of claim 6 further comprising:
receiving a request from a client device, wherein the request comprises:
a resource identifier; and
a user identifier;
determining that the user identifier is authorized to access the resource identifier according to the access control list;
receiving an encrypted resource from the web resource that corresponds to the resource identifier;
determining that the key identifier appended to the encrypted resource corresponds to the encryption key;
decrypting the encrypted resource using the encryption key to create a decrypted resource; and
sending the decrypted resource to the client device.

8. The method of claim 7 further comprising:
determining that a time of day of the request does not violate a time-of-day restriction according to the access control list;
determining that a data amount associated with the request does not violate a data quota according to the access control list; and
determining that the encryption key is not deactivated.

9. The method of claim 6 wherein the web resource is MICROSOFT SHAREPOINT.

10. The method of claim 6 further comprising:
determining that a first resource in the web resource comprises a form with structured data;
creating an encrypted form with the encryption key;
replacing data in in the form with placeholders that reference corresponding encrypted data in the encrypted form; and
storing the form in the web resource with the encrypted form as an attachment.

11. The method of claim 6 further comprising:
receiving a request from a client device, wherein the request comprises accessing a resource identifier;
determining that the resource identifier is included in the access control list;
determining that a resource associated with the resource identifier is not encrypted in the web resource; and
sending a message to the key manager operating on the first server indicating that the resource is not encrypted.

12. The method of claim 6 further comprising:
receiving a request from a client device, wherein the request comprises accessing a resource identifier;
receiving an encrypted resource from the web resource that corresponds to the resource identifier;
determining that the encryption key associated with the key identifier appended to the encrypted resource is deactivated; and
sending an indication to the client device that the encrypted resource is not accessible.

13. The method of claim 6 further comprising:
receiving a post request from a client device, wherein the post request comprises a resource identifier and an unencrypted resource;
determining that the resource identifier is included in the access control list;

determining that the encryption key is expired, wherein an expired key cannot be used to encrypt new files;

sending an indication to the client device that the unencrypted resource cannot be posted to the web resource.

14. The method of claim 13 wherein the indication is a standard SHAREPOINT access denied web page.

15. A non-transitory computer-readable memory having stored thereon a sequence of instructions which, when executed by one or more processors, causes the one or more processors to manage a security policy for a web resource by a key manager by:

receiving an encryption key policy and a key expiration date;

receiving a time of day restriction and a data quota;

receiving, from the web resource, one or more user identifiers, wherein the the web resource operates on a separate server;

receiving a selection of user identifiers from the one or more user identifiers;

defining an access control list based on the selection of user identifiers, the encryption key policy, the time of day restriction, and the data quota;

receiving, from the web resource on the separate server, one or more resource locators;

receiving a selection of a first resource locator from the one or more resource locators;

associating the access control list and the encryption key policy with the first resource locator;

generating an encryption key and a key identifier for the first resource locator;

sending the encryption key, the key identifier, and the access control list to a transparent encryption module, wherein:

the transparent encryption module is communicatively coupled to the web resource; and the transparent encryption module is located on the separate server;

encrypting the encryption key using a master encryption key; and storing the encrypted encryption key on a hard drive of the key manager; wherein the hard drive is physically secured from a web resource administrator of the separate server.

16. The non-transitory computer-readable memory of claim 15 wherein the master encryption key requires two security administrator passwords to access.

17. The non-transitory computer-readable memory of claim 15 wherein the one or more processors further manage the security policy for the web resource by the key manager by:

receiving an indication from the transparent encryption module that the encryption key is expired according to the encryption key policy;

generating a second encryption key and a second key identifier for the first resource locator; and sending the second encryption key and the second key identifier to the transparent encryption module.

18. The non-transitory computer-readable memory of claim 15 wherein the data quota comprising an expected number of downloads within a time period.

19. The non-transitory computer-readable memory of claim 15 wherein the one or more processors further manage the security policy for the web resource by the key manager by:

receiving an indication from the transparent encryption module that the transparent encryption module is missing the encryption key; and resending the encryption key to the transparent encryption module.

20. A system for maintaining the integrity of a transparent encryption system for a web resource by a watchdog function, the system comprising:

a processor; and a memory communicatively coupled with and readable by the processor and having stored therein a sequence of instructions which, when executed by the processor, cause the processor to maintaining the integrity of the transparent encryption system by:

establishing a secure communication channel between a key manager operating on a first server and a transparent encryption module operating on a second server;

receiving, from the key manager, information associated with a first resource locator in the web resource, wherein the information comprises:

an encryption key;

a key identifier; and an access control list;

sending the information to the transparent encryption module using the secure communication channel;

logging, on the first server, an attempt to access a first resource associated with the first resource locator by the transparent encryption module on the second server;

crawling the web resource on the second server to identify unencrypted resources that should be encrypted according to an encryption policy, wherein the watchdog function uses an application programming interface of the web resource;

monitoring the key manager to detect attempts to change a configuration of the key manager; and monitoring the transparent encryption module to determine whether any software is operating between the transparent encryption module and the web resource.

21. The system of claim 20 wherein the instructions further cause the processor to maintaining the integrity of the transparent encryption system by:

detecting a software process operating between the web resource and the transparent encryption module on the second server; and sending information to the key manager indicating the software process.

22. The system of claim 20 wherein the instructions further cause the processor to maintaining the integrity of the transparent encryption system by:

causing the transparent encryption module to prevent further decryption of resources in the web resource.

23. The system of claim 20 wherein the instructions further cause the processor to maintaining the integrity of the transparent encryption system by monitoring the physical security of the first server.

24. The system of claim 20 wherein the instructions further cause the processor to maintaining the integrity of the transparent encryption system by:

detecting an unencrypted resource that should be encrypted within the web resource; and causing the transparent encryption module to encrypt the unencrypted resource according to an encryption policy.

* * * * *

UNITED STATES PATENT AND TRADEMARK OFFICE
CERTIFICATE OF CORRECTION

PATENT NO. : 8,631,460 B2  
APPLICATION NO. : 13/426429  
DATED : January 14, 2014  
INVENTOR(S) : Woody Shea et al.

It is certified that error appears in the above-identified patent and that said Letters Patent is hereby corrected as shown below:

In the Specification:

Column 18, line 13, delete "keg's" and insert --key's--.

Column 19, line 17, delete "maybe" and insert --may be--.

Signed and Sealed this
Third Day of June, 2014

Michelle K. Lee
*Deputy Director of the United States Patent and Trademark Office*